United States Patent
Erz et al.

(12)

(10) Patent No.: US 12,410,061 B2
(45) Date of Patent: Sep. 9, 2025

(54) SPRAY EVAPORATION OF A LIQUID RAW MATERIAL FOR PREPARATION OF SILICON DIOXIDE AND METAL OXIDES

(71) Applicant: Evonik Operations GmbH, Essen (DE)

(72) Inventors: Joachim Erz, Schwörstadt (DE); Claudia Severin, Hofheim (DE); Maximilian Cornelius, Frankfurt am Main (DE)

(73) Assignee: Evonik Operations GmbH, Essen (DE)

( * ) Notice: Subject to any disclaimer, the term of this patent is extended or adjusted under 35 U.S.C. 154(b) by 690 days.

(21) Appl. No.: 16/628,664

(22) PCT Filed: Jun. 27, 2018

(86) PCT No.: PCT/EP2018/067265
§ 371 (c)(1),
(2) Date: Jan. 4, 2020

(87) PCT Pub. No.: WO2019/007782
PCT Pub. Date: Jan. 10, 2019

(65) Prior Publication Data
US 2020/0140282 A1  May 7, 2020

(30) Foreign Application Priority Data
Jul. 5, 2017 (EP) .................................. 17179702

(51) Int. Cl.
*C01B 33/18* (2006.01)
*C01G 23/07* (2006.01)

(52) U.S. Cl.
CPC ............ *C01B 33/183* (2013.01); *C01G 23/07* (2013.01); *C01P 2004/60* (2013.01)

(58) Field of Classification Search
CPC ....... C01B 33/183; C01B 13/34; C01G 23/07; C01P 2004/60
See application file for complete search history.

(56) References Cited

U.S. PATENT DOCUMENTS

| | | |
|---|---|---|
| 4,410,501 A | 10/1983 | Taramasso et al. |
| 4,687,643 A | 8/1987 | Cortesi et al. |

(Continued)

FOREIGN PATENT DOCUMENTS

| | | |
|---|---|---|
| CN | 1482062 | 3/2004 |
| CN | 101348263 | 1/2009 |

(Continued)

OTHER PUBLICATIONS

Heine et al., "Droplet and Particle Dynamics during Flame Spray Synthesis of Nanoparticles", Ind. Eng. Chem. Res., 2005, 44, 16, 6222-6232. (Year: 2005).*

(Continued)

*Primary Examiner* — Sally A Merkling
*Assistant Examiner* — Logan Edward Laclair
(74) *Attorney, Agent, or Firm* — Law Office of: Michael A. Sanzo, LLC

(57) ABSTRACT

The present invention relates to a process for preparing a metal oxide,
 comprising a) spraying a liquid raw material comprising at least one metal compound by mixing it with a gas to form an aerosol;
 b) forming a gaseous reaction mixture from the aerosol obtained in step a) by complete evaporation thereof;
 c) converting the gaseous reaction mixture obtained in step b) to metal oxide in the presence of oxygen.

20 Claims, 1 Drawing Sheet

(56) References Cited

U.S. PATENT DOCUMENTS

| | | | |
|---|---|---|---|
| 5,919,430 | A | 7/1999 | Hasenzahl et al. |
| 5,958,361 | A * | 9/1999 | Laine ............... C08G 79/00 |
| | | | 423/625 |
| 5,976,217 | A | 11/1999 | Kneringer et al. |
| 6,106,803 | A | 8/2000 | Hasenzahl et al. |
| 6,613,300 | B2 | 9/2003 | Mangold |
| 7,510,693 | B2 | 3/2009 | Katusic |
| 8,048,398 | B2 | 11/2011 | Katusic et al. |
| 8,277,765 | B2 | 10/2012 | Dietz et al. |
| 8,545,673 | B2 | 10/2013 | Dietz et al. |
| 9,748,567 | B2 | 8/2017 | Eihassid |
| 10,280,088 | B2 | 5/2019 | Schulze Isfort et al. |
| 10,384,940 | B2 | 8/2019 | Katusic et al. |
| 11,192,794 | B2 | 12/2021 | Schmidt et al. |
| 11,434,146 | B2 | 9/2022 | Kress et al. |
| 2001/0036437 | A1 | 11/2001 | Gutsch |
| 2002/0041963 | A1 | 4/2002 | Konya et al. |
| 2005/0069506 | A1 | 3/2005 | Katusic |
| 2005/0100666 | A1 | 5/2005 | Hampden-Smith |
| 2007/0231280 | A1 | 10/2007 | Schumacher et al. |
| 2009/0131694 | A1 | 5/2009 | Schumacher et al. |
| 2010/0102700 | A1 | 4/2010 | Jaiswal et al. |
| 2011/0171120 | A1 | 7/2011 | Lortz et al. |
| 2011/0236288 | A1 | 9/2011 | Panz et al. |
| 2013/0045158 | A1 | 2/2013 | Katusic |
| 2014/0301942 | A1 | 10/2014 | Hasenzahl et al. |
| 2017/0253547 | A1 | 9/2017 | Corre et al. |
| 2017/0275166 | A1 | 9/2017 | Katusic |
| 2017/0338487 | A1 | 11/2017 | Katusic |
| 2019/0352189 | A1 | 11/2019 | Kress et al. |
| 2020/0230703 | A1 | 7/2020 | Katusic |
| 2020/0231438 | A1 | 7/2020 | Schimek et al. |
| 2021/0163304 | A1 | 6/2021 | Schmidt et al. |
| 2021/0387859 | A1 | 12/2021 | Schmidt et al. |

FOREIGN PATENT DOCUMENTS

| | | |
|---|---|---|
| DE | 36 02 066 | 7/1987 |
| DE | 100 61 016 | 7/2002 |
| DE | 10 2015 104 653 | 9/2016 |
| EP | 0 306 018 | 3/1989 |
| EP | 0 471 139 | 2/1992 |
| EP | 0 814 058 | 12/1997 |
| EP | 1 138 632 | 10/2001 |
| EP | 1 142 830 | 10/2001 |
| EP | 2 944 611 | 11/2015 |
| JP | 2015500785 A * | 1/2015 |
| SG | 52988 A1 | 9/1998 |
| WO | WO 99/06331 | 2/1999 |
| WO | WO 2004/048261 | 6/2004 |
| WO | WO 2009/059900 | 5/2009 |
| WO | WO 2011/005631 | 1/2011 |
| WO | WO 2016/169842 | 10/2016 |
| WO | WO 2018/024661 | 2/2018 |
| WO | WO 2018/201054 | 11/2018 |
| WO | WO 2020/064401 | 4/2020 |

OTHER PUBLICATIONS

Yu et al (Aerosol assisted synthesis of silica/phenolic resin composite mesoporous hollow spheres, Colloid and Polymer Science, 2008) (Year: 2008).*
Barrett, et al., "The Determination of Pore vol. and Area Distributions in Porus Substances. I. Computations from Nitrogen Isotherms," *Journal of the American Chemical Society* 73(1):373-380 (Jan. 1951).
Lamberti, et al., "Structural Characterization of Ti-Silicate-1: A Synchrotron Radiation X-Ray Powder Diffraction Study," *Journal of Catalysis* 183(2):222 (Apr. 1999).
U.S. Appl. No. 16/770,593, filed Jun. 6, 2020, Schmidt.
Siriworarat, et al., "Production of methanol from carbon dioxide using palladium-copper-zinc loaded on MCM-41: Comparison of catalysts synthesized from flame spray pyrolysis and sol-gel method using silica source from rice husk ash," *Journal of Cleaner Production* 142:1234-1243 (2017).
Tani, et al., "Synthesis of zinc oxide/silica composite nanoparticles by flame spray pyrolysis," *Journal of Material Science* 37:4627-4632 (2002).
Office Action for copending U.S. Appl. No. 16/072,467, mailed Sep. 1, 2020.
European Office Action corresponding to U.S. Appl. No. 16/628,664, dated May 26, 2021.
Request for Continued Examination for copending U.S. Appl. No. 16/072,467, filed Jun. 29, 2021.
Amendment & Response to Accompany RCE for copending U.S. Appl. No. 16/072,467, filed Jun. 29, 2021.
Non Final Office Action for copending U.S. Appl. No. 16/476,274, mailed Nov. 19, 2021.
Non Final Office Action for copending U.S. Appl. No. 16/072,467, mailed Dec. 6, 2021.
Teoh, et al., "Flame spray pyrolysis: An enabling technology for nanoparticles design and fabrication," *Nanoscale* 8:1324-1347 (2010).
Wang, et al., "Flame aerosol synthesis of tungsten trioxide powder: Particle morphology control and photodegradation activity under visible light irradiation," *Powder Technology* 294:259-265 (2016).
English language translation of the International Search Report for corresponding international application, PCT/EP2018/067265 filed Jun. 27, 2018.
English language translation of the Written Opinion of the International Searching Authority for corresponding international application, PCT/EP2018/067265 filed Jun. 27, 2018.
English language translation of the International Preliminary Report on Patentability for corresponding international application, PCT/EP2018/067265 filed Jun. 27, 2018.
European Search Report and Search Opinion for corresponding EP 17179702 with partial English language machine translation of Search Opinion attached.
English language translation of the International Search Report for international application, PCT/EP2017/083749 filed Dec. 20, 2017; corresponding to copending U.S. Appl. No. 16/476,274.
English language translation of the Written Opinion of the International Searching Authority for international application PCT/EP2017/083749 filed Dec. 20, 2017; corresponding to copending U.S. Appl. No. 16/476,274.
English language translation of the International Preliminary Report on Patentability for international application PCT/EP2017/083749 filed Dec. 20, 2017; corresponding to copending U.S. Appl. No. 16/476,274.
European Search Report and Opinion for EP 17150660 with English language machine translation of Search Opinion attached; counterpart of copending U.S. Appl. No. 16/476,274.
Reply to European Search Opinion with English language machine translation attached.; counterpart of copending U.S. Appl. No. 16/476,274.
English language translation of the International Search Report for international application PCT/EP2017/051309, filed Jan. 23, 2017; corresponding to copending U.S. Appl. No. 16/072,467.
English language translation of the Written Opinion of the International Searching Authority for international application PCT/EP2017/051309, filed Jan. 23, 2017; corresponding to copending U.S. Appl. No. 16/072,467.
English language translation of the International Preliminary Report on Patentability for international application PCT/EP2017/051309, filed Jan. 23, 2017; corresponding to copending U.S. Appl. No. 16/072,467.
European Search Report and Opinion for U.S. Appl. No. 16/072,467 with English language machine translation of Search Opinion attached; counterpart of copending U.S. Appl. No. 16/072,467.
Reply to European Search Opinion with English language machine translation attached.; counterpart of copending U.S. Appl. No. 16/072,467.
Li, et al., "Flame aerosol synthesis of nanostructured materials and functional devices: Processing, modeling and diagnostics," *Progress in Energy and Combustion Science* 55:1-59 (May 2016).

(56) References Cited

OTHER PUBLICATIONS

Mädler, et al., "Flame-made ceria nanoparticles," J. Mater. Res. 17(6):1356-1362 (Jan. 2002).
Mädler, et al., "Controlled synthesis of nanostructured particles by spray pyrolysis," Aerosol Science 33(2):369-389 (Jan. 2002).
Wang, et al., "Ferroelectric WO$_3$ Nanoparticles for Acetone Selective Detection," Chem. Mater. 20:4794-4796 (Jan. 2008) with Supporting Information: Synthesis and Characterization Methods, pp. 1-5 attached (from Madler, et al.).
Wegner, et al., "Scale-up of nanoparticle synthesis in diffusion flame reactors," *Chemical Engineering Science* 58:4581-4589 (Oct. 2003).
U.S. Appl. No. 16/476,274, filed Jul. 6, 2019, US-2019/0352189 A1, Nov. 21, 2019, Kress.
U.S. Appl. No. 16/072,467, filed Jul. 24, 2018, Katusic.
Response to Office Action for copending U.S. Appl. No. 16/072,467, filed Dec. 1, 2020.
Final Office Action for copending U.S. Appl. No. 16/072,467, mailed Mar. 2, 2021.
Liu, et al., "Study on the Calcination of Titanium Silicalite Zeolie (TS-1)," *Advanced Materials Research* 287-290:317-321 (2011).
U.S. Appl. No. 17/279,061, filed Mar. 23, 2021, Schmidt.
Amendment & Response to Non Final Office Action for copending U.S. Appl. No. 16/476,274, filed Feb. 7, 2022.
Notice of Allowance for copending U.S. Appl. No. 16/476,274, mailed Mar. 7, 2022.

\* cited by examiner

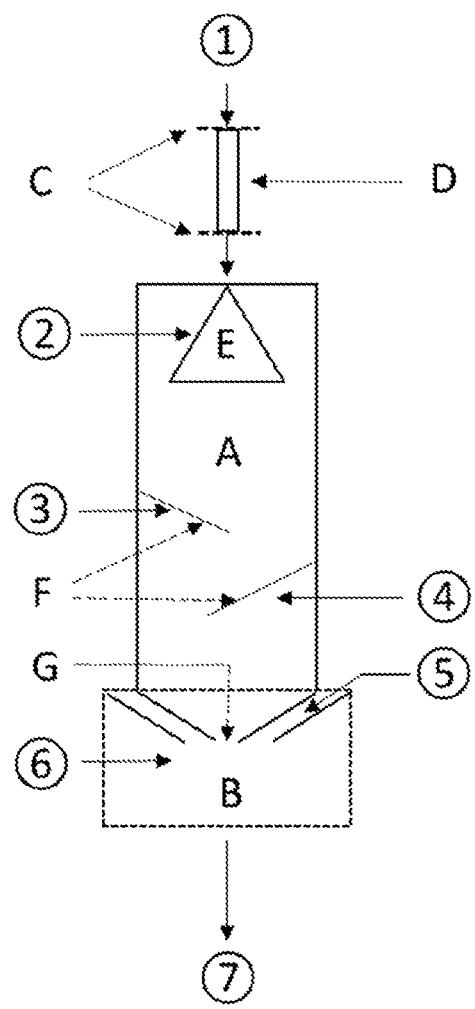

SPRAY EVAPORATION OF A LIQUID RAW MATERIAL FOR PREPARATION OF SILICON DIOXIDE AND METAL OXIDES

FIELD OF THE INVENTION

The present invention relates to a process for preparing silicon dioxide and metal oxides, especially pyrogenic silicon dioxide, proceeding from a liquid raw material comprising a metal compound.

BACKGROUND OF THE INVENTION

Pyrogenic silicon dioxide, also called fumed silica, is typically prepared by means of a flame hydrolysis or flame pyrolysis method. Flame hydrolysis for preparation of silicon dioxide is a process that has long been known and is performed on the industrial scale. In this process, a gaseous hydrolysable silicon halide is finely distributed in a flame that has been formed by combustion of a water-forming, hydrogen-containing fuel and an oxygen-containing gas. The combustion flame here provides water for the hydrolysis of the silicon halide, and sufficient heat for the hydrolysis reaction. The silicon dioxide powder entrained in the tail gases from the reaction is subjected to customary cooling and solids separation processes. Usually, silicon tetrachloride is used. When carbonaceous feedstocks are used, for example methyltrichlorosilane or dimethyldichlorosilane, an oxidation process additionally takes place for conversion of the carbon to carbon dioxide. If a non-halogenated silicon compound, for example a siloxane, is employed as raw material, the corresponding thermal oxidative conversion thereof to silica is called flame pyrolysis.

Silicon dioxide powder that forms as a result of both process types is referred to as pyrogenic silicon dioxide or fumed silica.

Analogously, proceeding from the suitable evaporable metal compounds, it is possible to prepare various metal oxide powders. For example, EP 1142830 A discloses obtaining metal oxide powders by combusting an aerosol composed of organic precursors dissolved in organic solvents.

Different types of introduction of the silicon or metal compound into the reaction flame have been described.

WO 2015003873 A1 discloses a process for preparing fumed silicas, in which vaporous streams of a hydrolysable and/or oxidizable silicon compound are reacted together with at least one fuel and oxygen in a flame hydrolysis reaction. In order to achieve better mixing of the gaseous components with one another, static mixing elements are used.

EP 0471139 A2 discloses the conversion of a gaseous halogen-free silicon compound to silica by flame pyrolysis. This involves, for example, conveying a liquid, evaporable cyclosiloxane into the burner with a gas stream from an external reservoir vessel, and converting it to silica.

The use of a gaseous polyalkylsiloxane in the preparation of silicas by means of flame pyrolysis has the disadvantage that the species having higher molecular weights can block the supply line as a result of gel formation, which can worsen the quality of the product obtained. This problem is solved in WO 99/06331 A1 by, in a process for preparing fumed silicas, finely distributing a liquid siloxane and feeding it directly into the flame, where the conversion thereof to silica takes place.

WO 2017/001366 A1 discloses a process which is similar in principle for preparing metal oxide powders by means of flame spray pyrolysis, in which a siloxane-containing aerosol is introduced directly into the flame in a reactor, where it is converted to silicon dioxide. In this case, the aerosol is obtained by joint atomization of a solution containing a metal compound and an atomization gas by means of one or more nozzles and the ratio of the spray area to the cross-sectional reactor area is at least 0.2.

US 2002041963 A1 discloses a process for preparing spherical, non-crystalline silicas by oxidative combustion of a siloxane in a burner at an adiabatic flame temperature of 1600 to 5600° C. In this case, the siloxane can be introduced into the flame in liquid or gaseous form.

WO 2004048261 A2 discloses a process for preparing pyrogenic metal oxide particles by introducing a liquid evaporable non-halogenated silicon dioxide precursor, for example octamethylcyclotetrasiloxane, into the gaseous fuel gas stream after the flame. The latter is obtained by combustion of a fuel in the presence of an oxidizing agent.

The processes known from the prior art, in which the gaseous metal compound is produced in a separate evaporator and introduced into the flame, have the disadvantage that the evaporator itself or the corresponding supply lines can easily become clogged or blocked with time by higher-boiling products or breakdown products. In this case, the continuous process for preparing the silica or a metal oxide often has to be interrupted and a time-consuming cleaning operation on the evaporator has to be undertaken. This reduces the stability and plannability of the overall production process and increases production costs. Apart from this, installation of a separate evaporator in a new production plant means considerable capital costs.

The methods that are likewise known in which the liquid metal compound is introduced directly into the flame often give poorer distribution of the reactant in the reaction zone and, consequently, poorer product quality as a result of its inhomogeneity.

SUMMARY OF THE INVENTION

The problem addressed by the present invention is that of providing an improved process for preparing silicon dioxide or metal oxides, which assures stable and good product quality and robust operation without interruptions. A further problem addressed by the present invention is that of providing a process for preparing silicon dioxide or metal oxides which works without use of a separate evaporator.

These problems were solved by a process for preparing silicon dioxide and/or a metal oxide, comprising the following steps: a) spraying a liquid raw material comprising at least one silicon compound and/or a metal compound by mixing it with a gas to form an aerosol; b) forming a gaseous reaction mixture from the aerosol obtained in step a) by complete evaporation thereof; c) converting the gaseous reaction mixture obtained in step b) to silicon dioxide and/or metal oxide in the presence of oxygen.

The liquid raw material containing at least one silicon compound and/or a metal compound is sprayed in step a) of the process according to the invention, i.e. finely distributed in the surrounding gas, and hence forms an aerosol, a biphasic liquid/gas mixture with liquid droplets finely distributed in gas.

The aerosol formed in step a) preferably comprises liquid droplets having a numerical average particle size of not more than 2 mm, more preferably of not more than 1 mm, most preferably of not more than 0.5 mm. Such a numerical average particle size of the liquid droplets in aerosol can be calculated, for example, by a person skilled in the art and results from the dimensions of the apparatuses used, corresponding flow rates, liquid and gas properties, and other parameters. Alternatively, the numerical average particle size of the aerosol formed in step a) can be measured directly by means of the laser diffraction method. The resulting measured droplet size distribution is used to define the median $d_{50}$, which reflects the droplet size not exceeded by 50% of all particles, as the numerical average particle size.

The spraying of the liquid that takes place in step a) of the process according to the invention can be achieved by means of different apparatuses and instruments that are known to the person skilled in the art for this purpose. For example, it is possible here to use disc atomizers, rotary atomizers, ultrasound atomizers, one-phase, two-phase or multiphase nozzles, and various injector systems or similar systems.

Preferably, in the process according to the invention, the liquid raw material is sprayed through at least one nozzle.

BRIEF DESCRIPTION OF THE DRAWINGS

FIG. 1 is a schematic diagram of a reactor suitable for carrying out the process of the invention. The figure includes reference letters denoting reactor zones and components, and reference numerals identifying functional elements involved in the process.

DETAILED DESCRIPTION OF THE INVENTION

The liquid raw material used in the process according to the invention forms an aerosol through spraying. The liquid raw material can be mixed with a gas simultaneously with the spraying, in step a), or directly after the spraying, in step b). The aerosol formed at first can be distributed further and diluted in a gas stream.

The ratio of total gas volume used in steps a) and b) in standard cubic metres to the amount of the liquid raw material used in kg is preferably from 0.05 to 200, more preferably from 0.1 to 100, more preferably from 0.5 to 50, $m^3$ (STP)/kg.

The gas used in step a) and/or b) preferably comprises oxygen, preferably in the form of a mixture comprising oxygen and nitrogen, particular preference being given to using air as gas in step a).

In step b) of the process according to the invention, a gaseous reaction mixture is formed from the aerosol obtained in step a).

More preferably, relatively easily evaporable liquid silicon compounds and/or metal compounds which remain stable on evaporation, i.e. are not subject to thermal breakdown, are used in the process according to the invention. It is particularly advantageous when the silicon compounds and/or metal compounds used have a boiling point of less than 300° C. at 10 mbar, more preferably of less than 300° C. at 100 mbar, most preferably of less than 300° C. at 500 mbar. Unless explicitly stated otherwise, the values for absolute pressures are always reported in relation to the present invention.

In order to ensure that no liquid droplets containing silicon compound and/or metal compound have to be converted to silicon dioxide or metal oxide in the reaction flame, complete evaporation and conversion of all liquid components of the aerosol obtained in step a) to the gas phase takes place in step b) of the process according to the invention.

Such an evaporation of the liquid raw material after the aerosol has been formed can be achieved by different means. In principle, additional energy can be transferred to the aerosol by an appropriate heat source and/or the partial pressure of the evaporated liquid in the gas stream can be reduced after the aerosol has been formed. Accordingly, one possible implementation of steps a) and b) of the process according to the invention can be effected through the use of a preheated gas. The gas used in step a) and/or b), preferably air, can be preheated to a temperature of 50 to 400° C., more preferably of 80 to 350° C. The liquid raw material may also be preheated prior to performance of step a). The liquid raw material used can also be superheated, i.e. heated to a temperature higher than boiling point at standard pressure. Preferably, the liquid raw material, prior to performance of step a), is preheated to a temperature up to 500° C., more preferably 100 to 400° C., more preferably 150 to 350° C. The preheating and possible superheating of the raw material used reduces the amount of energy needed for evaporation thereof that has to be provided via the preheated gas.

The energy needed for evaporation of the liquid raw material can be provided either via the preheating of the raw material used or via the preheated gas into which the raw material is sprayed. Thus, the conditions can be optimized to the respective raw material, and it is also possible to use critical raw materials, for example those having low breakdown temperatures.

Since the adiabatic flame temperature during the performance of step c) of the process according to the invention usually reaches more than 500° C., preferably from 1000 to 2500° C., the above-described preheating of the reaction mixture promotes reduction of the temperature gradient in the flame and hence formation of silicon dioxide and/or metal oxide particles with homogeneous sizes.

In a preferred embodiment of the invention, the liquid raw material used in step a), prior to performance of step a), has a pressure of at least 1 bar, more preferably at least 1.5 bar, most preferably at least 2 bar. The gas mixture obtained in step b) can preferably have a pressure of not more than 1.2 bar, preferably not more than 1.1 bar, more preferably not more than 1 bar.

Preferably, in step b) of the process according to the invention, a higher temperature of the gaseous reaction mixture than that corresponding to the dew point of this mixture is attained. It is thus ensured that a completely gaseous reaction mixture is used in step c) of the process according to the invention. Preferably, the gaseous reaction mixture used in step c) has a temperature higher by at least 10° C., more preferably by at least 30° C., most preferably by at least 50° C., than the dew point temperature of this mixture.

Steps a) and b) of the process according to the invention may take place in direct succession or at least partly simultaneously. Preferably, steps a) and b) take place at least partly simultaneously, meaning that the evaporation of the liquid takes place at least partly even as the liquid raw material is still being sprayed.

The oxygen needed for the conversion of the silicon compound and/or metal compound to silicon dioxide and/or metal oxide can be supplied during at least one of steps a) to c). It is possible here to use oxygen, for example in pure form or as a mixture with other gases, especially air. When air is introduced during the performance of steps a) and/or b), it is still referred to as primary air. It may also be advantageous when secondary air is additionally used during step c). In general, the amount of secondary air will be such that the ratio of secondary air to primary air is from 0.1 to 10.

It is particularly advantageous when oxygen is present in excess compared to combustible constituents of the reaction mixture. The index λ (lambda) is the ratio of the amount of oxygen present in the reaction mixture divided by the amount of oxygen needed for the complete combustion of all combustible constituents of the reaction mixture, each in mol/h. Preferably, λ is set at greater than 1.2; more preferably, λ of 1.4 to 5 is chosen.

During at least one of steps a)-c) of the process according to the invention, a gaseous fuel can be used. Examples of such a fuel include hydrogen, methane, ethane, propane, butane and/or natural gas.

The reactor for conversion of the liquid raw material comprising at least one silicon compound and/or metal compound to silicon dioxide and/or metal oxide by the process according to the invention may comprise at least two reactor zones A and B, each of which may be the parts of a common reaction chamber, may overlap with one another or may be spatially separated from one another. The functional role of the reaction chamber A is mainly to convert the liquid raw material used to a gaseous reaction mixture by means of at least one gas. In the reaction zone B, by contrast, a chemical conversion of the gas mixture formed beforehand, containing silicon compound and/or metal compound, to silicon dioxide and/or metal oxide takes place.

Preferably, reactor zone A is above reactor zone B. More preferably, the silicon compound and/or metal compound is introduced in the upper part of reactor zone A.

The reactor zone A may contain those elements which can improve the mixing of the liquid silicon compound and/or metal compound introduced into reactor zone A and the gas. For example, reactor zone A may contain various baffles or static mixers.

The invention is elucidated in detail hereinafter with reference to FIG. 1, which shows a specific embodiment of the present invention. This greatly simplified drawing is intended to give a complete overview of the process steps according to the invention. There follows a detailed description (Table 1) of the fundamental reactor parts (A-G) and of the corresponding reactant and product streams (1) to (7).

TABLE 1

Reference numbers/letters and explanations of FIG. 1

| | |
|---|---|
| A | Reactor zone A |
| B | Reactor zone B |
| C | Optional filter upstream and/or downstream of the raw material preheating (D) |
| D | Optional preheating of the liquid raw material |
| E | Fine distributor of the liquid raw material in the gas (nozzle) |
| F | Optional mixing elements (static mixers) |
| G | Mouth of burner |
| (1) | Liquid containing a silicon and/or metal compound for preheating D |
| (2) | Primary air to the distributor E |
| (3) | Gaseous silicon compound and/or metal compound to reactor zone A |
| (4) | Optional core fuel (for example hydrogen) to reactor zone A |
| (5) | Optional peripheral fuel (for example hydrogen) to reactor zone B |
| (6) | Secondary air to reactor zone B |
| (7) | Product mixture comprising silicon dioxide and/or metal oxide |

In the reactor shown in FIG. 1, the liquid raw material, a liquid comprising silicon compound and/or metal compound, is preheated if required in an apparatus intended for the purpose (D). Before and/or after the preheating, it is optionally possible for one or more filters (C) to be installed in order to free the raw material used of any solid particles present therein. In the particular embodiment shown in FIG. 1, the reactor zones A and B are positioned one on top of the other. In the upper part of the reactor zone A, the liquid raw material (1) is introduced via a fine distributor (E) and finely distributed. The primary air (2) likewise introduced in the upper part of the reactor zone A ensures that the finely distributed liquid raw material containing silicon compound and/or metal compound and gas are mixed with one another, and a gaseous reaction mixture or an aerosol which becomes fully gaseous further on in the reactor zone A is formed. Better mixing of the gaseous components in the reactor zone A is achieved with the mixing elements (F) installed therein, for example static mixers. An identical gaseous silicon and/or metal compound (3) to that present in (1) or another can additionally be fed to the reactor zone A. If a silicon and/or metal compound other than that used in (1) is used here, the corresponding mixed oxides can be prepared as product. A fuel gas, for example hydrogen, can be supplied both to the reactor zone A (core fuel, 4) and to the reactor zone B (peripheral fuel, 5). In the latter case, peripheral hydrogen can contribute to stabilization of the flame produced in the reactor zone B. Optionally, it is also possible to supply an additional amount of air (secondary air, 6) to the reactor zone B, in which the conversion of the reaction mixture to the product mixture comprising silicon dioxide and/or metal oxide (7) takes place.

The metal oxide obtainable by the process according to the invention preferably contains at least one of the elements aluminium (Al), cerium (Ce), iron (Fe), magnesium (Mg), indium (In), titanium (Ti), tin (Sn), yttrium (Y), zinc (Zn) and zirconium (Zr) as metal component, more preferably Al and/or Ti.

Metal oxides in the context of the invention also include mixed metal oxides and doped metal oxides, also including silicon dioxide doped with metal oxides, metal oxides doped with silicon dioxide, or mixed oxides containing metal oxides and silicon dioxide.

A mixed metal oxide is understood to mean a metal oxide in which intimate mixing of mixed oxide components takes place at the level of primary particles or aggregates. The primary particles in this case may have oxygen-bridged metal components in the form of M1-O-M2 bonds. In addition, it is also possible for there to be regions of individual oxides M1O, M2O, M3O, . . . in the primary particles.

A doped metal oxide is understood to mean an oxide in which the doping component is present predominantly or exclusively at a lattice site of the metal oxide lattice. The doping component may be in metallic or oxidic form. One example of a doped metal oxide is indium tin oxide, where tin atoms occupy sites in the lattice of the indium oxide.

The silicon and metal compounds in the context of the present invention may be organometallic and/or inorganic in nature. Examples of inorganic starting materials may especially be silicon tetrachloride, metal chlorides and metal nitrates. Organometallic compounds used may especially be silicon alkoxides and/or metal alkoxides and/or metal carboxylates. The alkoxides used may preferably be ethoxides, n-propoxides, isopropoxides, n-butoxides and/or tert-butoxides. The carboxylates used may be the compounds based on acetic acid, propionic acid, butanoic acid, hexanoic acid, oxalic acid, malonic acid, succinic acid, glutaric acid, adipic acid, octanoic acid, 2-ethylhexanoic acid, valeric acid, capric acid and/or lauric acid. Particularly advantageously, it is possible to use 2-ethylhexanoates and/or laurates.

The silicon compounds and/or metal compounds used in the process according to the invention may, according to their nature, be dissolved, for example, in water or in organic solvents. Accordingly, liquid raw material containing a silicon compound and/or metal compound, in the context of the present invention, may be the solution of a silicon compound and/or metal compound, or even of a solid. The term "liquid raw material" relates to the state of matter thereof under conditions that exist in the case of use in step a) of the process according to the invention.

Organic solvents, or constituents of organic solvent mixtures, may preferably be alcohols such as methanol, ethanol, n-propanol, isopropanol, n-butanol or tert-butanol, diols such as ethanediol, pentanediol, 2-methylpentane-2,4-diol, dialkyl ethers such as diethyl ether, tert-butyl methyl ether or tetrahydrofuran, C1-C12 carboxylic acids such as acetic acid, propionic acid, butanoic acid, hexanoic acid, oxalic acid, malonic acid, succinic acid, glutaric acid, adipic acid, octanoic acid, 2-ethylhexanoic acid, valeric acid, capric acid, lauric acid. In addition, it is possible to use ethyl acetate, benzene, toluene, naphtha and/or benzine. It is possible with preference to use solutions that contain C2-C12 carboxylic acids, especially 2-ethylhexanoic acid and/or lauric acid.

Preferably, the content of the C2-C12 carboxylic acids in the solution is less than 60% by weight, more preferably less than 40% by weight, based on the total amount of solution.

In a particularly preferred embodiment, the solutions of the silicon compounds and/or metal compounds simultaneously contain a carboxylate and its parent carboxylic acid and/or an alkoxide and its parent alcohol. More particularly, the starting materials used may be the 2-ethylhexanoates in a solvent mixture containing 2-ethylhexanoic acid.

In a particularly preferred embodiment of the process according to the invention, a silicon compound is used for preparation of silicon dioxide.

The silicon compound used in the process according to the invention may be a non-halogenated compound selected from the group consisting of tetraalkoxyorthosilicates, silanes, silicone oils, polysiloxanes and cyclic polysiloxanes, silazanes and mixtures thereof. Tetraalkoxyorthosilicates used may, for example, be tetraethoxyorthosilicate (TEOS) and tetramethoxyorthosilicate (TMOS). Silanes used are preferably alkoxysilanes, alkylalkoxysilanes, arylalkylalkoxysilanes, for example tetramethoxysilane, tetraethoxysilane, methyltrimethoxysilane, methyltriethoxysilane, dimethyldimethoxysilane, dimethyldiethoxysilane, trimethylmethoxysilane, trimethylethoxysilane, diethylpropylethoxysilane. Polysiloxanes and cyclic polysiloxanes, for example octamethylcyclotetrasiloxane, decamethylcyclopentasiloxane, dodecamethylcyclohexasiloxane, hexamethylcyclotrisiloxane and silazanes such as hexamethyldisilazane may likewise be used as silicon compound in the process according to the invention. Particular preference is given to using octamethylcyclotetrasiloxane.

The silicon compound used in the process according to the invention may likewise be a chlorinated compound selected from the group consisting of silicon tetrachloride, dichlorosilane, trichlorosilane, methyltrichlorosilane, dimethyldichlorosilane, methyldichlorosilane, dibutyldichlorosilane, ethyltrichlorosilane, propyltrichlorosilane and mixtures thereof. Particular preference is given to using silicon tetrachloride.

For preparation of an aluminium oxide by the process according to the invention, aluminium chloride in particular is suitable as the corresponding metal compound. The aluminium chloride, a compound which is solid under standard conditions, may be used in the form of a melt or a solution in a suitable solvent.

For the preparation of titanium dioxide, it is possible to use titanium tetrachloride, for example, as the corresponding metal compound.

EXAMPLE 1

Octamethylcyclotetrasiloxane (D4) is initially charged in a 200 litre vat and conveyed with a gear pump at a constant conveying rate of 12.5 kg/h to a pipe coil heated with thermal oil (FIG. 1, D), in order to preheat D4 to 150° C. The octamethylcyclotetrasiloxane that has been preheated in this way is guided to a one-phase nozzle (FIG. 1, E) from SCHLICK (Hollow-Cone Mod. 121) with a bore diameter of 0.7 mm, which in this case generates a backpressure of about 2.8 bara. The filter (FIG. 1, C) installed upstream of the nozzle ensures that the nozzle cannot become clogged by any solid particles present. The preheated D4 finely distributed by means of the one-phase nozzle is mixed with an air stream preheated to 295° C. (FIG. 1, 2). The spraying of the liquid octamethylcyclotetrasiloxane into this preheated air results in complete evaporation of D4 in the downstream pipeline (burner tube) (FIG. 1, A) having the diameter of 80 mm and a length of 4.2 metres, and forms a gas mixture. In a downstream static mixer (FIG. 1, F) from Sulzer (Mischer CompaX™ with metered addition), 6.25 m$^3$ (STP)/h of hydrogen (FIG. 1, 3) are mixed in (primary H$_2$). Good mixing of all components promotes complete and homogeneous conversion of the raw materials in the downstream reaction zone (FIG. 1, B). The gas mixture thus produced is fed to the burner and, with a calculated exit velocity of 51 m/s (under standard conditions) or 99 m/s (under operating conditions), exits from the mouth of the burner (FIG. 1, G) having diameter 32 mm into the reaction zone (FIG. 1, B). For stabilization of the flame, what is called a peripheral flame is generated. For this purpose, an additional 3 m$^3$ (STP)/h of hydrogen flows out of a concentric annular gap with gap width 1.5 mm, and burns in a diffusive pilot flame. The hot reaction products are drawn into the reaction zone with 55 m$^3$ (STP)/h of externally introduced air (FIG. 1, 6). The gas/solids mixture produced after the reaction is cooled down to <200° C. and then supplied pneumatically to a filter system. The pyrogenic oxide formed (10 kg/h) is separated here from the main gas stream and conveyed into a bunker. The further details for performance of this experiment can be found in Table 2.

By contrast with the preparation process for pyrogenic silicon dioxide described in EP 0471139 A2, in the process according to the invention, the raw material to be processed (octamethylcyclotetrasiloxane) is not converted to the gas phase in an external evaporator via heating at a hot wall surface, but via spraying, i.e. via direct transfer of a preheated, finely distributed liquid into the gas phase by mixing with the air stream in the reactor zone A intended for the purpose.

The process described here was operable successfully for several months without clogging of the nozzle or other apparatuses by solid particles or deposits in gel form.

EXAMPLE 2

Analogously to Example 1, silicon tetrachloride (tetrachlorosilane, SiCl$_4$) is used as raw material for preparation of pyrogenic silicon dioxide. The details for performance of this experiment can be found in Table 2.

EXAMPLE 3

Analogously to Example 1, titanium tetrachloride (TiCl$_4$) is used as raw material for preparation of pyrogenic titanium dioxide. The details for performance of this experiment can be found in Table 2.

TABLE 2

|  | Example 1 | Example 2 | Example 3 |
|---|---|---|---|
| Raw material | D4 | $SiCl_4$ | $TiCl_4$ |
| Raw material boiling point [° C.] | 171-175 | 57 | 136 |
| Raw material feed temperature [° C.] | 150 | 30 | 30 |
| Raw material throughput [kg/h] | 12.5 | 80 | 530 |
| Primary air rate [m³ (STP)/h] | 128 | 70 | 1545 |
| Primary air feed temperature [° C.] | 295 | 270 | 230 |
| Primary $H_2$ rate [m³ (STP)/h] | 6.3 | 26 | 180 |
| Primary $H_2$ feed temperature [° C.] | 35 | 30 | 30 |
| Reaction mixture temperature upstream of the reaction zone [° C.] | 255 | 63 | 138 |
| Pressure upstream of the reactor zone [mbar] | 995 | 985 | 990 |
| One-phase nozzle diameter [mm] (number of nozzles) | 0.7 (1) | 1.4 (1) | 2.3 (3) |
| Burner tube diameter [mm] | 80 | 80 | 200 |
| Burner tube length [m] | 4.2 | 4.2 | 3.0 |
| Burner tube volume [l] | 15 | 15 | 377 |

The invention claimed is:

1. A process for preparing silicon dioxide and/or a metal oxide, comprising the following steps:
   a) forming an aerosol by spraying a liquid raw material comprising at least one silicon compound and/or a metal compound into a gas stream;
   b) forming a gaseous reaction mixture by complete evaporation of the aerosol obtained in step a);
   c) converting the gaseous reaction mixture that was formed by complete evaporation in step b) to silicon dioxide and/or a metal oxide by reacting the gaseous reaction mixture in a flame at an adiabatic flame temperature of more than 500° C. in the presence of oxygen;
   wherein the process takes place in a reactor comprising reaction zones A and B, and wherein:
   step b) takes place entirely in zone A;
   step c) takes place entirely in zone B.

2. The process of claim 1, wherein evaporation in step b) comprises heating the aerosol and/or reducing the partial pressure of the evaporated liquid in the gas stream.

3. The process of claim 2, wherein evaporation in step b) comprises preheating the gas to a temperature of 50 to 400° C.

4. The process of claim 2, wherein evaporation in step b) comprises preheating the gas to a temperature of 80 to 350° C.

5. The process of claim 4, and wherein the adiabatic flame temperature during step c) is 1000-2500° C.

6. The process of claim 1, wherein the aerosol formed in step a) comprises liquid droplets having a numerical average particle size of not more than 2 mm, wherein the aerosol is a biphasic liquid/gas mixture with the liquid droplets finely distributed in the gas.

7. The process of claim 1, wherein the silicon compound is used for preparation of silicon dioxide.

8. The process of claim 7, wherein the silicon compound is a non-halogenated compound selected from the group consisting of: tetraalkoxyorthosilicates; silanes; silicone oils; polysiloxanes and cyclic polysiloxanes; silazanes; and mixtures thereof.

9. The process of claim 7, wherein the silicon compound is a chlorinated compound selected from the group consisting of: silicon tetrachloride; dichlorosilane; trichlorosilane; methyltrichlorosilane; dimethyldichlorosilane; methyldichlorosilane; dibutyldichloro-silane; ethyltrichlorosilane; propyltrichlorosilane; and mixtures thereof.

10. The process of claim 9, wherein evaporation in step b) comprises preheating the gas to a temperature of 80 to 350° C.

11. The process of claim 10, and wherein the adiabatic flame temperature during step c) is 1000-2500° C.

12. The process of claim 11, wherein the aerosol formed in step a) comprises liquid droplets having a numerical average particle size of not more than 2 mm.

13. The process of claim 11, wherein the ratio of gas volume in standard cubic metres used in total in steps a) and b) to the amount of the liquid raw material used in kilograms is from 0.1 to 100 m³ (STP)/kg.

14. The process of claim 1, wherein a metal oxide is prepared comprising at least one of the elements Al, Ce, Fe, Mg, In, Ti, Sn, Y, Zn and/or Zr as the metal component.

15. The process of claim 14, wherein evaporation in step b) comprises preheating the gas to a temperature of 80 to 350° C.

16. The process of claim 15, and wherein the adiabatic flame temperature during step c) is 1000-2500° C.

17. The process of claim 16, wherein the aerosol formed in step a) comprises liquid droplets having a numerical average particle size of not more than 2 mm.

18. The process of claim 16, wherein the ratio of gas volume in standard cubic metres used in total in steps a) and b) to the amount of the liquid raw material used in kilograms is from 0.1 to 100 m³ (STP)/kg.

19. The process of claim 1, wherein the liquid raw material used in step a), prior to performance of step a), has a pressure of at least 1.5 bar and the gas mixture obtained in step b) has a pressure of not more than 1.2 bar.

20. The process of claim 19, wherein the aerosol formed in step a) comprises liquid droplets having a numerical average particle size of not more than 2 mm and the ratio of gas volume in standard cubic metres used in total in steps a) and b) to the amount of the liquid raw material used in kilograms is from 0.1 to 100 m³ (STP)/kg.

* * * * *